United States Patent
Lefsrud et al.

(10) Patent No.: US 11,399,551 B2
(45) Date of Patent: Aug. 2, 2022

(54) METHOD FOR STORING HARVESTED PHOTOSYNTHETIC ACTIVE HORTICULTURAL PRODUCE

(71) Applicant: U TECHNOLOGY CORPORATION, Calgary (CA)

(72) Inventors: Mark Lefsrud, Hudson (CA); Kamal Hammad, Calgary (CA); Anne Sophie Rufyikiri, Sainte-Anne-de-Bellevue (CA)

(73) Assignee: U TECHNOLOGY CORPORATION, Calgary (CA)

( * ) Notice: Subject to any disclaimer, the term of this patent is extended or adjusted under 35 U.S.C. 154(b) by 256 days.

(21) Appl. No.: 16/676,537

(22) Filed: Nov. 7, 2019

(65) Prior Publication Data

US 2020/0146219 A1    May 14, 2020

Related U.S. Application Data

(60) Provisional application No. 62/757,792, filed on Nov. 9, 2018.

(51) Int. Cl.
*A23B 7/015*      (2006.01)
*A23B 7/04*      (2006.01)

(52) U.S. Cl.
CPC .............. *A23B 7/015* (2013.01); *A23B 7/04* (2013.01)

(58) Field of Classification Search
CPC ........ A01G 7/045; A01G 9/246; A01G 9/249; A01G 9/26; A23B 7/015; A23B 7/04; Y02A 40/25; Y02P 60/14

(Continued)

(56) References Cited

U.S. PATENT DOCUMENTS

| | | | | |
|---|---|---|---|---|
| 2,108,305 A | * | 2/1938 | Coe ........................ | A24B 15/30 426/234 |
| 3,578,464 A | * | 5/1971 | Mpelkas ................ | A23B 7/015 426/248 |

(Continued)

FOREIGN PATENT DOCUMENTS

| | | | |
|---|---|---|---|
| EP | 2128546 A1 * | 12/2009 | ........... F25D 25/025 |
| JP | 2013179937 A * | 9/2013 | |

(Continued)

OTHER PUBLICATIONS

Abstract for BR 202019019184U2, pub: Mar. 23, 2021, Pereira E (Year: 2021).*

(Continued)

*Primary Examiner* — Drew E Becker
(74) *Attorney, Agent, or Firm* — ABM Intellectual Property Inc.; Adrienne Bieber McNeil

(57) ABSTRACT

A method for storing harvested photosynthetic active horticultural produce includes, between harvesting and consumption of the harvested photosynthetic active horticultural produce, exposing the harvested photosynthetic active horticultural produce to green light and/or to blue-green light. A device for storing harvested photosynthetic active horticultural produce includes a casing defining an interior volume, and a cooling mechanism for cooling the interior volume. At least a first LED is supported by the casing. The first LED is configured to emit green light to the interior volume, or is configured to emit blue-green light to the interior volume.

8 Claims, 10 Drawing Sheets

(58) Field of Classification Search
USPC .......................................................... 426/248
See application file for complete search history.

(56) References Cited

U.S. PATENT DOCUMENTS

| | | | | |
|---|---|---|---|---|
| 2006/0042300 | A1* | 3/2006 | Kim .................. | A23B 7/04 |
| | | | | 62/348 |
| 2007/0151149 | A1* | 7/2007 | Karpinski .............. | A01G 7/045 |
| | | | | 47/58.1 LS |
| 2009/0280223 | A1* | 11/2009 | Scott .................. | A23L 3/26 |
| | | | | 426/237 |
| 2010/0043287 | A1* | 2/2010 | Jones .................... | A01G 7/045 |
| | | | | 47/1.01 R |
| 2010/0281771 | A1* | 11/2010 | Kudo .................... | A01G 7/045 |
| | | | | 47/1.01 R |
| 2011/0209400 | A1 | 9/2011 | Rooymans | |
| 2016/0143116 | A1* | 5/2016 | Chen .................. | A23B 7/015 |
| | | | | 426/248 |
| 2017/0055538 | A1* | 3/2017 | Ohta ................... | A23L 3/266 |
| 2017/0292779 | A1* | 10/2017 | Lee ....................... | F25D 17/042 |
| 2018/0310578 | A1* | 11/2018 | Nicole ................. | A23B 7/015 |
| 2019/0000020 | A1 | 1/2019 | Theisen | |

FOREIGN PATENT DOCUMENTS

| | | | |
|---|---|---|---|
| KR | 100889114 B1 | * | 3/2009 |
| SU | 762797 B | * | 9/1980 |

OTHER PUBLICATIONS

Translation of KR 8891144B1, pub: Mar. 17, 2009 (Year: 2009).*
https://www.oxfordreference.com/view/10.1093/oi/authority.20110803095628819.
Plant Physiology and Development, Sixth Edition; Lincoln Taiz, Eduardo Zeiger, Ian M. Møller, and Angus Murphy; published by Sinauer Associates, Figure 9.6 and related text.

* cited by examiner

US 11,399,551 B2

METHOD FOR STORING HARVESTED PHOTOSYNTHETIC ACTIVE HORTICULTURAL PRODUCE

CROSS REFERENCES TO RELATED APPLICATIONS

This application claims the benefit of and/or priority from U.S. Provisional Patent Application No. 62/757,792, filed on Nov. 9, 2018, which is incorporated herein by reference in its entirety.

FIELD

This document relates to the storage of produce. More specifically, this document relates to methods for storing harvested photosynthetic active horticultural produce, and to related devices.

BACKGROUND

US Patent Application Publication No. 2011/0209400A1 (Rooymans) discloses a lighting assembly for growing plants. The lighting assembly has a first light source emitting light in a first wavelength range of 600 to 750 nm; a second light source emitting light in a second wavelength range of 375 to 500 nm; and a controller for controlling the output of the first light source independent from the output of the second light source. Disclosed are also an enclosure for growing plants, and a method for growing plants.

SUMMARY

The following summary is intended to introduce the reader to various aspects of the detailed description, but not to delimit any invention.

Methods for extending the shelf-life of harvested photosynthetic active horticultural produce are disclosed. According to some aspects, a method for extending the shelf-life of harvested photosynthetic active horticultural produce includes, a. during storage of the harvested photosynthetic active horticultural produce, exposing the harvested photosynthetic active horticultural produce to green light.

In some examples, the green light is emitted from a monochromatic LED and has a peak wavelength of between 500 nm and 580 nm, inclusive. In some examples, the green light is emitted at approximately the light compensation point for the harvested photosynthetic active horticultural produce at the peak wavelength. In some examples, the green light has a peak wavelength of 500 nm, or a peak wavelength of 560 nm.

In some examples, the method further includes exposing the harvested photosynthetic active horticultural produce to non-green light concurrently with step a. In some examples, the non-green light is ambient fluorescent light. In some examples, the non-green light is emitted from a monochromatic LED.

In some examples, during storage, the harvested photosynthetic active horticultural produce is exposed to the green light for an integrated photoperiod of at least 4 hours daily, or of at least 8 hours daily, or of between 8 and 16 hours daily.

In some examples, the harvested photosynthetic active horticultural produce includes leafy greens. In some examples, step a. includes exposing a leaf top surface of the harvested leafy greens to the green light, and exposing a leaf bottom surface of the harvested leafy greens to the green light. In some examples, the harvested leafy greens include at least one of spinach, kale, basil, and lettuce. In some examples, the harvested leafy greens include spinach. In some examples, the harvested leafy greens include kale.

In some examples, the harvested photosynthetic active horticultural produce includes a fruit, and/or a vegetable, and/or a flower.

In some examples, the method further includes refrigerating the harvested photosynthetic active horticultural produce during the exposure to the green light.

In some examples, step a. includes exposing the harvested photosynthetic active horticultural produce to only green light for a daily photoperiod.

In some examples, the method further includes sensing a light parameter around the harvested photosynthetic active horticultural produce, and adjusting at least one of the irradiance and the wavelength of the green light based on the sensed light parameter.

In some examples, step a. includes placing the harvested photosynthetic active horticultural produce in a casing, and activating a green light emitting LED within the casing.

Also disclosed herein is a use of green light to extend the shelf-life of harvested photosynthetic active horticultural produce.

Also disclosed herein are devices for extending the shelf life of harvested photosynthetic active horticultural produce. According to some aspects, a device for extending the shelf life of harvested photosynthetic active horticultural produce includes a casing defining an interior volume, a cooling mechanism for cooling the interior volume, and at least a first green light emitting LED supported by the casing and configured to emit green light to the interior volume.

In some examples, the first LED is configured to emit green light at a peak wavelength of between 500 nm and 580 nm, inclusive. In some examples, the green light has a peak wavelength of 500 nm. In some examples, the green light has a peak wavelength of 560 nm.

In some examples, the device further includes a timer in communication with the first LED.

In some examples, the device further includes a sensor supported by the casing for sensing at least one of a light parameter, a temperature parameter, and a relative humidity parameter in the interior volume.

In some examples, the casing is configured to block exterior light from entering the interior volume.

Also disclosed herein are methods for storing harvested photosynthetic active horticultural produce. According to some aspects, a method for storing harvested photosynthetic active horticultural produce includes, a. between harvesting and consumption of the harvested photosynthetic active horticultural produce, exposing the harvested photosynthetic active horticultural produce to green light and/or blue-green light.

In some examples, step a. includes exposing the harvested photosynthetic active horticultural produce to the green light. The green light can be emitted from a monochromatic LED and can have a peak wavelength of between about 500 nm and about 580 nm, inclusive. The green light can have a peak wavelength of about 500 nm, or a peak wavelength of about 560 nm. The green light can be emitted at approximately the light compensation point for the harvested photosynthetic active horticultural produce at the peak wavelength.

In some examples, step a. includes exposing the harvested photosynthetic active horticultural produce to the blue-green light. The blue-green light can be emitted from a monochromatic LED and can have a peak wavelength of between about 460 nm and about 499 nm, inclusive. The blue-green light can have a peak wavelength of about 470 nm. The blue-green light can be emitted at approximately the light compensation point for the harvested photosynthetic active horticultural produce at the peak wavelength.

In some examples, step a. includes exposing the harvested photosynthetic active horticultural produce to only the green light or only the blue light for a daily photoperiod.

In some examples, the method includes exposing the harvested photosynthetic active horticultural produce to additional light concurrently with step a. The additional light can be ambient fluorescent light. The additional light can be emitted from a monochromatic LED.

In some examples, between harvesting and consumption, the harvested photosynthetic active horticultural produce is exposed to the green light for an integrated photoperiod of at least 4 hours daily, or is exposed to the blue-green light for an integrated photoperiod of at least 4 hours daily. In some examples, between harvesting and consumption, the harvested photosynthetic active horticultural produce is exposed to the green light for an integrated photoperiod of at least 8 hours daily, or is exposed to the blue-green light for an integrated photoperiod of at least 8 hours daily. In some examples, between harvesting and consumption, the harvested photosynthetic active horticultural produce is exposed to the green light for an integrated photoperiod of between 8 and 16 hours daily, or is exposed to the blue-green light for an integrated photoperiod of between 8 and 16 hours daily.

In some examples, the photosynthetic active horticultural produce includes leafy greens. Step a. can include exposing a leaf top surface of the harvested leafy greens to the green light and/or to the blue-green light, and exposing a leaf bottom surface of the harvested leafy greens to the green light and/or to the blue-green light. The harvested leafy greens can include at least one of spinach, kale, basil, and lettuce. The harvested leafy greens can include spinach. The harvested leafy greens can include kale.

In some examples, the harvested photosynthetic active horticultural produce includes a fruit. In some examples, the harvested photosynthetic active horticultural produce includes a vegetable. In some examples, the harvested photosynthetic active horticultural produce includes a flower.

In some examples, the method further includes refrigerating the harvested photosynthetic active horticultural produce during the exposure to the green light and/or during exposure to the blue light.

In some examples, the method further includes sensing a light parameter around the harvested photosynthetic active horticultural produce, and adjusting at least one of the irradiance and the wavelength of the green light and/or the blue light based on the sensed light parameter.

In some examples, step a. includes: i. placing the harvested photosynthetic active horticultural produce in a casing; and ii. activating a green light emitting LED and/or a blue-green light emitting LED within the casing.

Also disclosed is the use of green light and/or blue-green light to extend the shelf-life of harvested photosynthetic active horticultural produce.

Also disclosed are devices for storing harvested photosynthetic active horticultural produce. According to some aspects, a device for storing harvested photosynthetic active horticultural produce includes: a casing defining an interior volume; a cooling mechanism for cooling the interior volume; and at least a first LED supported by the casing, wherein the first LED is configured to emit green light to the interior volume, or is configured to emit blue-green light to the interior volume.

In some examples, the first LED is configured to emit the green light to the interior volume. The first LED can be configured to emit the green light at a peak wavelength of between about 500 nm and about 580 nm, inclusive. The green light can have a peak wavelength of about 500 nm. The green light can have a peak wavelength of about 560 nm.

In some examples, the first LED is configured to emit blue-green light to the interior volume. The first LED can be configured to emit blue-green light at a peak wavelength of between about 460 nm and about 499 nm, inclusive. The blue-green light can have a peak wavelength of about 470 nm.

In some examples, the device includes a timer in communication with the first LED.

In some examples, the device includes a sensor supported by the casing for sensing at least one of a light parameter, a temperature parameter, and a relative humidity parameter in the interior volume.

In some examples, the casing is configured to block exterior light from entering the interior volume.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Figure 1A:
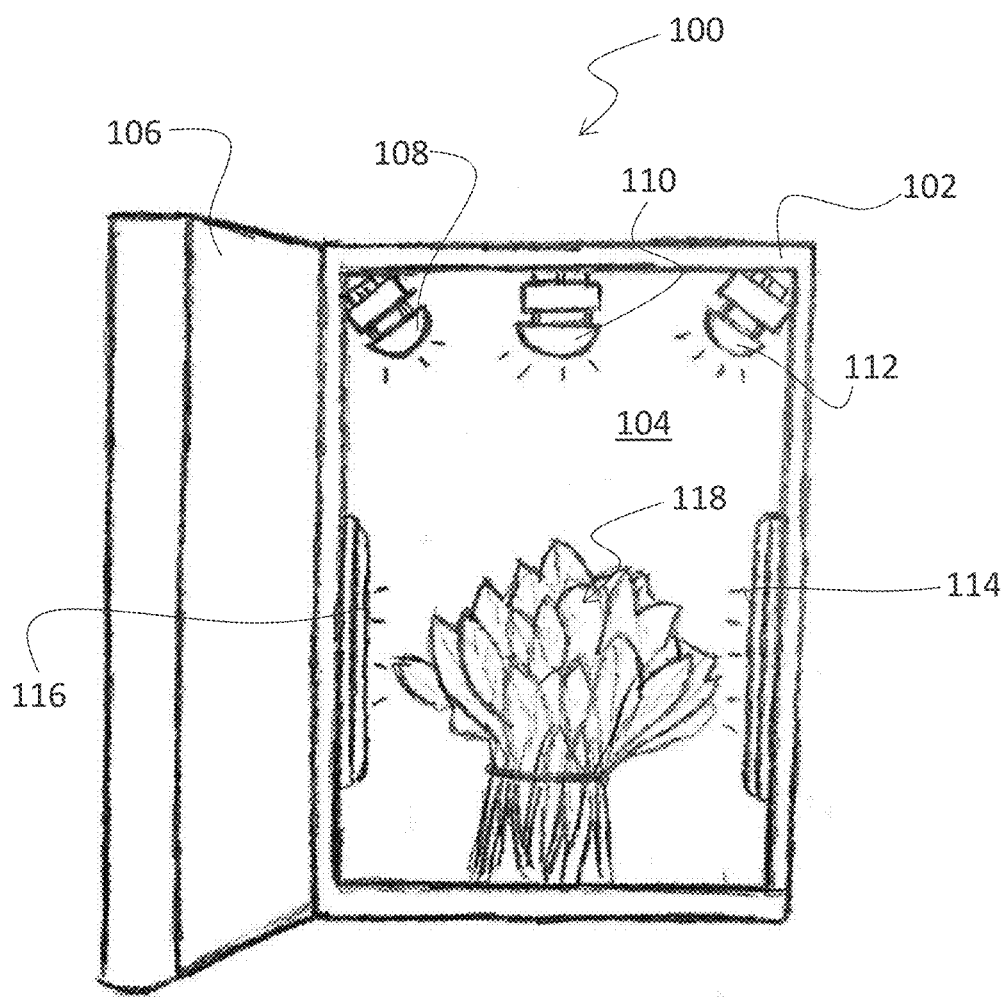
FIG. 1A is a schematic view of an example device for storing harvested photosynthetic active horticultural produce.

Various apparatuses or processes or compositions will be described below to provide an example of an embodiment of the claimed subject matter. No embodiment described below limits any claim and any claim may cover processes or apparatuses or compositions that differ from those described below. The claims are not limited to apparatuses or processes or compositions having all of the features of any one apparatus or process or composition described below or to features common to multiple or all of the apparatuses or processes or compositions described below. It is possible that an apparatus or process or composition described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

Disclosed herein are methods that involve exposing harvested photosynthetic active horticultural produce (also referred to herein as HPAH produce) to green light and/or blue-green light (e.g. green light emitted from a monochromatic LED, and/or blue-green light emitted from a monochromatic LED) during storage. Related devices are also disclosed.

The methods disclosed herein can result in stomatal aperture closure, photosynthetic rate near light compensation point, and stability of atmospheric moisture content in the HPAH. This in turn can result in HPAH produce that has improved visual quality over an extended period of time (i.e. has an extended shelf-life). Accordingly, the methods can be used to extend the shelf-life of HPAH produce.

As used herein, the term 'horticultural produce' refers to a plant and/or plant part (e.g. leaf, stem, root, flower or fruit) that is grown specifically for consumption, conversion, or display As used herein, the term 'harvested' indicates that the produce has been picked or cut or dug out of or otherwise removed from the growing media.

As used herein, the term 'photosynthetic active' indicates that the produce is actively undergoing photosynthesis, even after being harvested. Examples of photosynthetic active produce include leafy greens such as spinach, kale, lettuce, and basil; vegetables such as broccoli and cabbage; fruits such as green peppers; and flowers such as *cannabis*.

As used herein, the term 'green light' refers to light emitted from one or more monochromatic sources and having a peak wavelength of between 500 nm and 580 nm, inclusive. For example, the peak wavelength can be 500 nm, or 560 nm. One example of a monochromatic source is a monochromatic green light emitting LED.

As used herein, the term 'blue-green light' refers to light emitted from one or more monochromatic sources and having a peak wavelength of between 460 nm and 499 nm, inclusive. For example, the peak wavelength can be 470 nm. One example of a monochromatic source is a monochromatic blue-green light emitting LED.

In some examples, the green light and/or blue-green light is emitted at approximately the light compensation point for the HPAH produce at that wavelength. For example, it has been determined that for spinach, when exposed to light at a peak wavelength of 501 nm, the light compensation point is 65.3 µmol m$^{-2}$ s$^{-1}$, and when exposed to light at a peak wavelength of 560 nm, the light compensation point is 64.7 µmol m$^{-2}$ s$^{-1}$. Accordingly, in the case of spinach, green light may for example be emitted at a peak wavelength of 501 nm and at an irradiance of about 65.3 µmol m$^{-2}$ s$^{-1}$, and/or at a peak wavelength of 560 nm and at an irradiance of about 64.7 µmol m$^{-2}$ s$^{-1}$. Similarly, for kale, when exposed to light at a peak wavelength of 501 nm, the light compensation point is 50.8 µmol m$^{-2}$ s$^{-1}$, and when exposed to light at a peak wavelength of 560 nm, the light compensation point is 44.1 µmol m$^{-2}$ s$^{-1}$. Accordingly, in the case of kale, green light may for example be emitted at a peak wavelength of 501 nm and at an irradiance of about 50.8 µmol m$^{-2}$ s$^{-1}$, and/or at a peak wavelength of 560 nm and at an irradiance of about 44.1 µmol m$^{-2}$ s$^{-1}$.

In some examples, the HPAH produce is exposed to only the green light or only the blue-green light for a period of time. For example, the HPAH produce can be stored in an enclosure that blocks exterior light (e.g. ambient fluorescent light), and can be exposed to only the green light or only the blue-green light while in the enclosure. Alternatively, the HPAH produce can be exposed to green light and blue-green light together (and only to green light and blue-green light), or to the green light and/or blue-green light while also being exposed to additional light (where the additional light is not green light and is not blue-green light). For example, the HPAH produce can be exposed to green light while also being exposed to ambient fluorescent light (e.g. the HPAH produce can be exposed to green light while being displayed in a grocery store). In another example, the HPAH produce can be exposed to green light while also being exposed to non-green light from another monochromatic source, such as a red or blue light emitting LED.

As noted above, the HPAH produce can be exposed to green light and/or blue-green light between harvesting and consumption, either continuously or for a portion of that time period. Furthermore, the HPAH produce can optionally be refrigerated during the exposure to the green light and/or the blue-green light. For example, the HPAH produce can be exposed to green light and/or blue-green light while the HPAH produce is transported (e.g. on a truck or a train or a boat, and optionally while being refrigerated), and/or while the HPAH produce is displayed in a grocery store or other retail environment (e.g. in a refrigerated display), and/or while the HPAH produce is kept in a home (e.g. in a home refrigerator). Accordingly, the green light(s) and/or blue-green light(s) may be mounted in a storage box, or on a shelf, or in a refrigerator, or in another storage environment.

In some examples, during storage, the HPAH produce is exposed to green light, blue-green light, or a combination thereof for an integrated photoperiod of at least 4 hours daily. For example, the HPAH produce can be exposed to the green light for an integrated photoperiod of at least 8 hours daily, or between 8 hours and 16 hours daily. For further example, the HPAH produce can be exposed to blue-green light for an integrated photoperiod of at least 8 hours daily, or between 8 hours and 16 hours daily.

In some examples, the HPAH produce can be exposed to green light and/or blue-green light coming from various angles. For example, in the case of leafy greens, both the top surface of the leaves and the bottom surface of the leaves can be exposed to the green light and/or the blue-green light. This can be achieved by positioning at least one green light source and/or at least one blue-green light source above the leaves and at least one green light source and/or at least one blue-green light source below the leaves.

In some examples, a sensor is positioned proximate the HPAH produce, for sensing a parameter around the HPAH produce. The sensor can be, for example, a light sensor, a temperature sensor, or a relative humidity sensor. The irradiance and/or the wavelength of the green light can then be adjusted based on the sensed parameter.

Various devices may be used in conjunction with the methods described above. For example, existing devices such as storage boxes (optionally refrigerated storage boxes), retail displays (e.g. refrigerated displays), and home refrigerators can be retrofitted or redesigned to include one or more green light sources. An example of one such refrigerated storage box is shown in FIG. 1A. The storage box 100 includes a casing 102 defining an interior volume 104 and having an openable door 106. A cooling mechanism (not shown) is provided for cooling the interior volume 104. First 108, second 110, and third 112 green light emitting LEDs are supported by the casing, at the top portion of the interior volume 104. Fourth 114, and fifth 116 green light emitting LEDs are supported by the casing along the sides of the interior volume 104. The LEDs are configured to emit green light to the interior volume, so that HPAH produce 118 stored in the interior volume is exposed to the green light. As described above, the LED's can be configured to emit green at a peak wavelength of between about 500 nm and about 580 nm, inclusive (e.g. about 500 nm and/or about 560 nm).

Figure 1B:
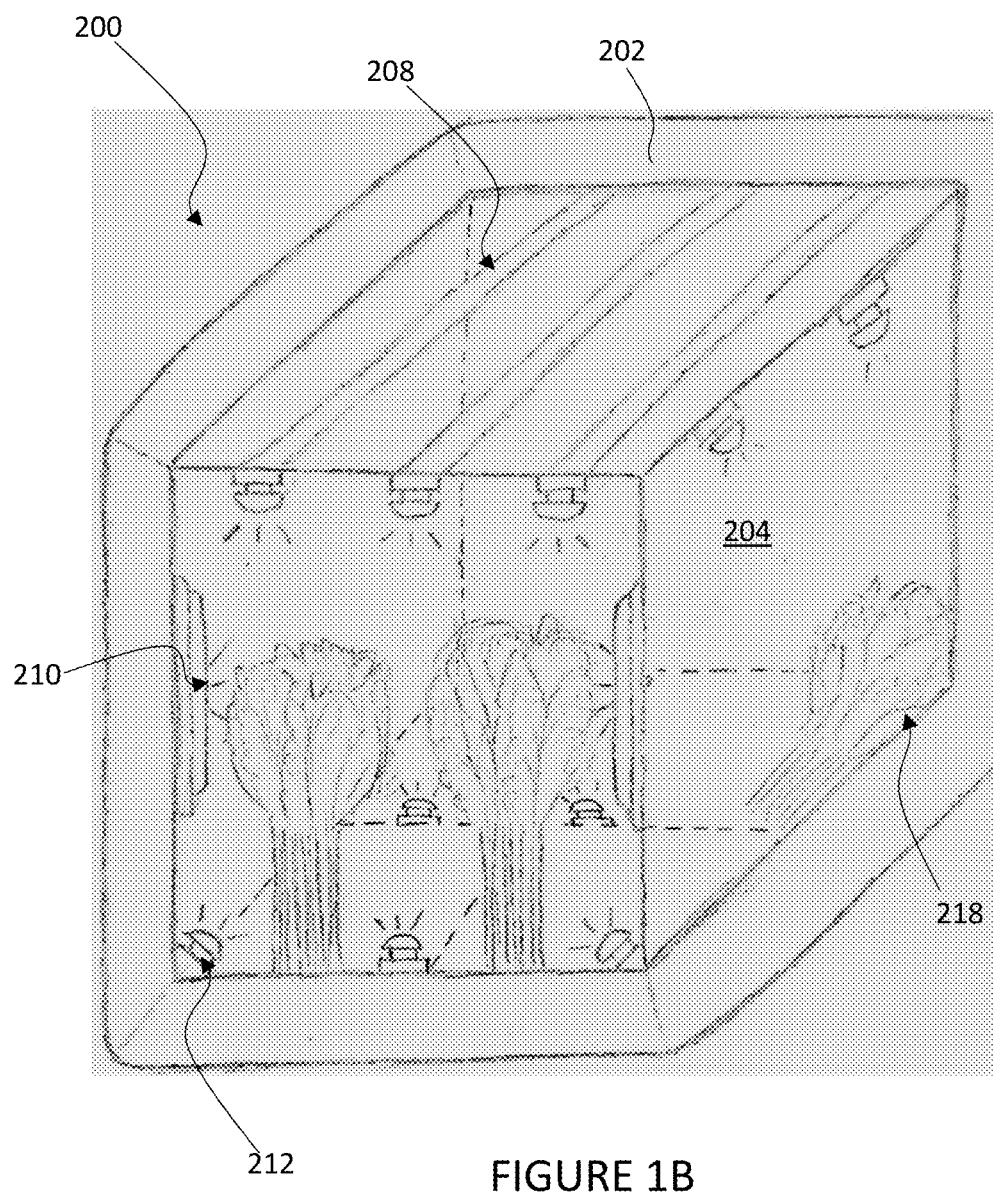
FIG. 1B is a schematic view of another example device for storing harvested photosynthetic active horticultural produce.

An example of another refrigerated storage box is shown in FIG. 1B. The storage box 200 includes a casing 202 (only some of the walls of which are shown) defining an interior volume 204. A cooling mechanism (not shown) is provided for cooling the interior volume 204. A first set 208 of green light emitting LEDs are supported by the casing 202, at the top portion of the interior volume 204. A second set 210 of green light emitting LEDs are supported by the casing 202 along the sides of the interior volume 204. A third set 212 of green light emitting LEDs are supported by the casing 202, at the bottom portion of the interior volume 204. The LEDs are configured to emit green light to the interior volume, so that HPAH produce 218 stored in the interior volume is exposed to the green light. Furthermore, the HPAH produce 218 can be upright, or can be laid down. As described above, the LED's can be configured to emit green at a peak wavelength of between about 500 nm and about 580 nm, inclusive (e.g. about 500 nm and/or about 560 nm).

Optionally, the device can include a timer (not shown) in communication with the LEDs for controlling the photoperiod of exposure to green light.

Optionally, a sensor (not shown) can be supported by the casing for sensing at least one of a light parameter, a temperature parameter, and a relative humidity parameter in the interior volume.

Optionally, the casing can be configured to block exterior light from entering the interior volume.

In alternative examples, one or more of the green light emitting LEDs can be replaced with a blue-green light emitting LED.

While the above description provides examples of one or more processes or apparatuses or compositions, it will be appreciated that other processes or apparatuses or compositions may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

EXAMPLES

Experiment 1

Materials and Methods

Plant Culture:

'Winterbor' kale and 'Melody' spinach were seeded in rockwool cubes (Grodan A/S, Dk-2640, Hedehusene, Denmark) and germinated in a growth chamber (Model E15; Conviron, Winnipeg, Manitoba, Canada) under white fluorescent lights (4200 K, F72T8CW, Osram, USA) at 150 $\mu mol\ m^{-2}\ s^{-1}$ irradiance, 25° C./25° C., 70% day/night temperature and relative humidity, ambient $CO_2$ and a daily photoperiod of 16 hours. The plants were watered weekly with a full-strength Hoagland nutrient solution (Hoagland and Arnon, 1950).

Wavelength Testing and Photosynthetic Measurements:

Measurements occurred when the 4th true leaf emerged, two weeks after germination for kale and three weeks for spinach. At this stage, the plants were treated with 14 different wavelengths of LEDs (ORBITEC, Madison, Wis., USA) across the PAR spectrum (400 nm to 700 nm). The wavelengths used are as follows: 405 nm, 417 nm, 430 nm, 449 nm, 470 nm, 501 nm, 519 nm, 530 nm, 560 nm, 575 nm, 595 nm, 624 nm, 633 nm, and 661 nm. Irradiance levels tested were 50, 100, and 150 $\mu mol\ m^{-2}\ s^{-1}$; however, the 575 nm LED array could not reach an irradiance level of 150 $\mu mol\ m^{-2}\ s^{-1}$, thus the data point used was the highest intensity obtained (140 $\mu mol\ m^{-2}\ s^{-1}$). The measurement of wavelengths and light intensities were determined using a light sensor (Spectroradiometer PS-300, Apogee Instruments, Logan, Utah, USA). The plants were tested for gas exchange using the LI-COR *Arabidopsis* chamber (LI-COR, Lincoln, Nebr., USA; LI-6400XT Portable Photosynthesis System). Plants rooted in wet rockwool cubes were wrapped in parafilm for moisture retention. The test plants were placed in the *Arabidopsis* chamber in the dark for 10 minutes for baseline data collection. The LI-6400 controlled the relative humidity (75%+/−3.5%), $CO_2$ concentration (400 ppm+/−10 ppm) and temperature (23° C. +/−1 degree C.). Light treatment with irradiance levels of 50, 100 and 150 $\mu mol\ m^{-2}\ s^{-1}$ were tested (>30 minutes) while monitoring carbon dioxide levels. Plants were placed in the dark for 10 minutes between the randomly selected wavelengths for dark respiration and to avoid carry over effects from previous measurements. After data collection, leaves were detached to calculate leaf area. A digital image was taken and Image J software (Bethesda, Md., USA) was used to determine leaf area and to calculate leaf-area-normalized photosynthetic rates.

Stomatal Response:

Full intact, two-week-old plants were moved from the chamber and treated with 14 LED wavelengths (405, 417, 430, 449, 470, 501, 519, 530, 560, 575, 595, 624, 633 and 661 nm) for 40 minutes to determine stomatal response using direct stomatal observation. A clear nail polish (Wildshine, Markwins Beauty products. Inc, Industry, Calif., USA) was painted on the upper and lower epidermis of the third true leaf in the interveinal part (~1 cm$^2$). After drying, the clear nail polish was removed using transparent tape from the leaf to extract epidermal imprints and placed on a microscope slide for counting. The stomata were observed under a microscope from three different identification fields for the upper and lower epidermis. The stomata counts were added, averaged and normalized. The counts were assigned values as open stomata at 80% aperture opening, partially open stomata at 50% aperture opening, and closed stomata at 0% aperture opening.

Shelf Life Testing:

Standard commercial six to eight-week-old kale (Winterbor; IGA Atwater, Montreal, Quebec, Canada) and spinach (Melody; Adonis Atwater, Montreal, Quebec, Canada) were purchased for this experiment. The kale and spinach purchased at the retail stores were from different farms, but each species came from the same farm for each replicate. Only newly displayed produce was selected for the treatment experiment. The treatments included: darkness (control), standard white fluorescent light (50 µmol m$^{-2}$ s$^{-1}$), 500 nm (55 µmol m$^{-2}$ s$^{-1}$) and 560 nm (55 µmol m$^{-2}$ s$^{-1}$) LED wavelengths. The plants were placed in boxes (length: 64 cm, width: 40 cm, height: 40 cm) lined with black plastic and stored for 6 days at a temperature of 20° C., humidity of 50% and a daily photoperiod of 12 hours. Each treatment contained three mature plants of kale and three mature plants of spinach cut just above the roots. The fresh mass of each plant was recorded before and after each treatment. The visual assessment scale was determined using three separate individuals to observe and record their responses for the leaves on a scale of 1-5 as stated by Kader and Cantwell (2010). After treatment, each plant was dried in an isotemp oven (Fischer Scientific Isotemp, Charlottesville, Va., USA) at 40° C. for three days and the dry mass was recorded. The fresh mass and dry mass were used to obtain moisture loss and moisture content on a fresh mass basis.

Statistical Analysis:

The data was analyzed using SAS (Cary, N.C., USA) proc GLM. Scheffe's test was used for multiple comparisons for the given wavelength, intensities and treatments. The light compensation point for each wavelength was obtained using a regression analysis, estimating the relationship between the dependent variables and treatments in the experiment.

Results and Discussion

Figure 2:
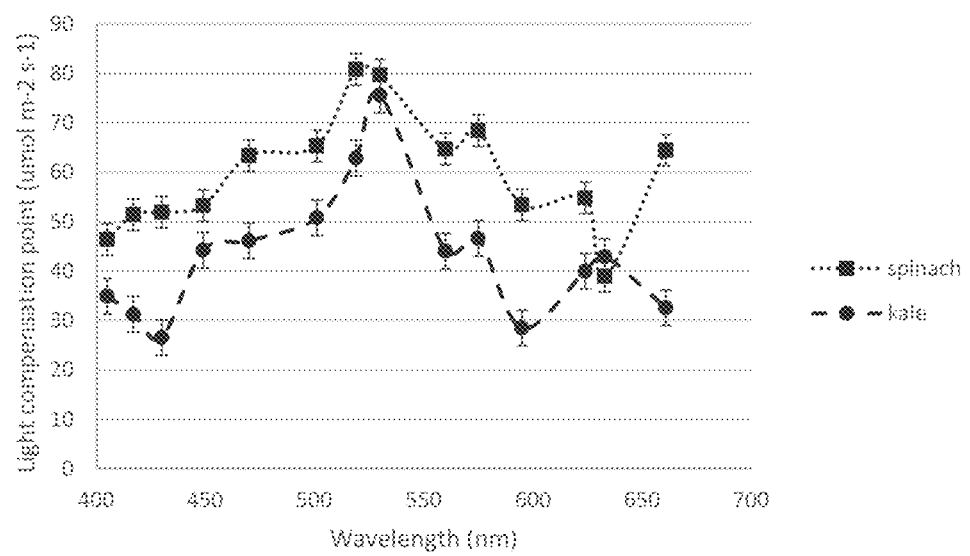
FIG. 2 is a graph showing light compensation points of 'Melody' spinach (*Spinacia oleracea* L.) and 'Winterbor' kale (*Brassica oleracea* L.). Light treatments of 14 wavelengths (405, 417, 430, 449, 470, 501, 519, 530, 560, 575, 595, 624, 633 and 661 nm) at 4 irradiance levels: 0, 50, 100 and 150 µmol m$^{-2}$ s$^{-1}$. Each data point was replicated three times with different plants. The data are means of three replicates +/−S.E.

Light Compensation Points:

A linear regression analysis was used to determine the light compensation point for each wavelength. For spinach, in the blue LED light spectrum, the light compensation point was 46.4 µmol m$^{-2}$ s$^{-1}$ at 405 nm, 51.4 µmol m$^{-2}$ s$^{-1}$ at 417 nm, 51.9 µmol m$^{-2}$ s$^{-1}$ at 430 nm, 53.2 µmol m$^{-2}$ s$^{-1}$ at 449 nm and 63.4 µmol m$^{-2}$ s$^{-1}$ at 470 nm (FIG. 2). In the green LED light spectrum, the light compensation resulted in 65.3 µmol m$^{-2}$ s$^{-1}$ for 501 nm, 80.8 µmol m$^{-2}$ s$^{-1}$ for 519 nm, 79.7 µmol m$^{-2}$ s$^{-1}$ for 530 nm, 64.7 µmol m$^{-2}$ s$^{-1}$ for 560 nm, 68.4 µmol m$^{-2}$ s$^{-1}$ for 575 nm and 53.4 µmol m$^{-2}$ s$^{-1}$ for 595 nm (FIG. 2). The light compensation point in the red LED light spectrum for wavelengths 624, 633 and 661 nm resulted in 54.8, 39.0 and 64.4 µmol m$^{-2}$ s$^{-1}$, respectively (FIG. 2).

For kale, the light compensation point in the blue LED light spectrum at 405 nm resulted in 34.9 µmol m$^{-2}$ s$^{-1}$, 31.3 µmol m$^{-2}$ s$^{-1}$ at 417 nm, 26.5 µmol m$^{-2}$ s$^{-1}$ at 430 nm, 44.2 µmol m$^{-2}$ s$^{-1}$ at 449 nm and 46.1 µmol m$^{-2}$ s$^{-1}$ at 470 nm. In the green LED light spectrum, the light compensation points were 50.8 µmol m$^{-2}$ s$^{-1}$ at 501 nm, 62.9 µmol m$^{-2}$ s$^{-1}$ at 519 nm, 75.6 µmol m$^{-2}$ s$^{-1}$ at 530 nm, 44.1 µmol m$^{-2}$ s$^{-1}$ at 560 nm, 46.6 µmol m$^{-2}$ s$^{-1}$ at 575 nm and 28.9 µmol m$^{-2}$ s$^{-1}$ at 595 nm. The light compensation point in the red LED light spectrum for wavelengths 624, 633 and 661 nm resulted in 39.9 µmol m$^{-2}$ s$^{-1}$, 42.9 µmol m$^{-2}$ s$^{-1}$ and 32.6 µmol m$^{-2}$ s$^{-1}$, respectively.

The light compensation point of spinach shows peaks at 519, 530, 575 and 661 nm (FIG. 2). The light compensation point of kale shows peaks at 530, 575 and 633 nm (FIG. 2). The average light compensation point of spinach was 59.8 µmol m$^{-2}$ s$^{-1}$ and the average light compensation point of kale was 43.4 µmol m$^{-2}$ s$^{-1}$. The light compensation points of both spinach and kale show peaks at 530 nm at 80 µmol m$^{-2}$ s$^{-1}$ but kale had a lower light compensation point than spinach ranging from 10-30 µmol m$^{-2}$ s$^{-1}$ lower. Winterbor kale may have a lower light compensation point due to its ability have a lower respiration rate during light limited conditions. This discovery would allow kale to be stored under lower irradiance levels than spinach while still maintaining better quality.

The regression analysis of spinach and kale showed a good fit for the light compensation points. The R2 of the linear models show a fit of 80 to 90%.

The link between photosynthetic activity and light compensation typically results in an increase in photosynthetic rate with a corresponding decrease in the light compensation point. Wavelengths with high photosynthetic rates have a low light compensation point and wavelengths with low photosynthetic rates have a high compensation point (FIG. 2).

Stomatal Response:

The results show a similar action spectrum for both Melody spinach and Winterbor kale. The stomatal aperture openings under blue (405-430 nm) and red (624-661 nm) LED light showed higher stomatal aperture opening, while the stomata aperture opening was lower under the green LED light (500-560 nm).

Figure 3:
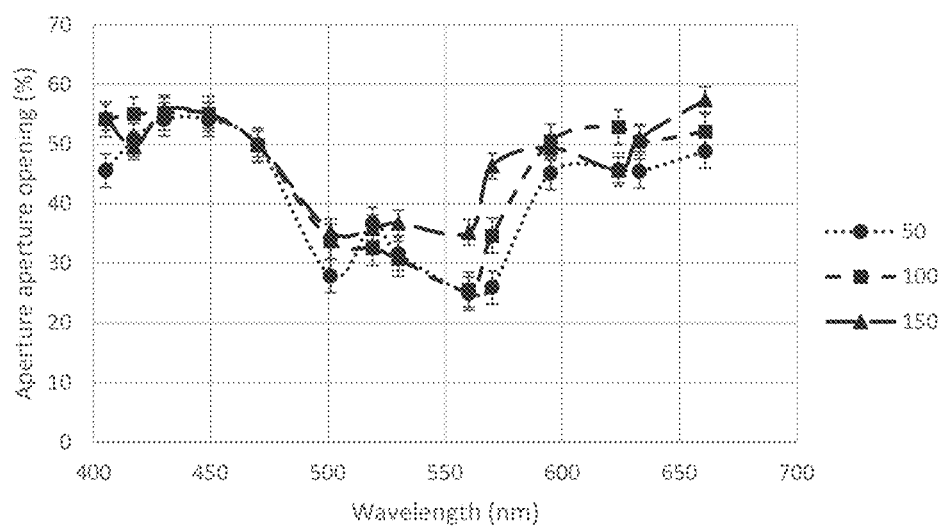
FIG. 3 is a graph showing the average percentage of stomatal aperture opening of 'Melody' spinach (*Spinacia oleracea* L.) seedlings at an irradiance level of 50, 100 and 150 µmol m$^{-2}$ s$^{-1}$ from 14 LED wavelengths (405, 417, 430, 449, 470, 501, 519, 530, 560, 575, 624, 633 and 661 nm). The data are means of three replicates +/−S.E.
Figure 5:
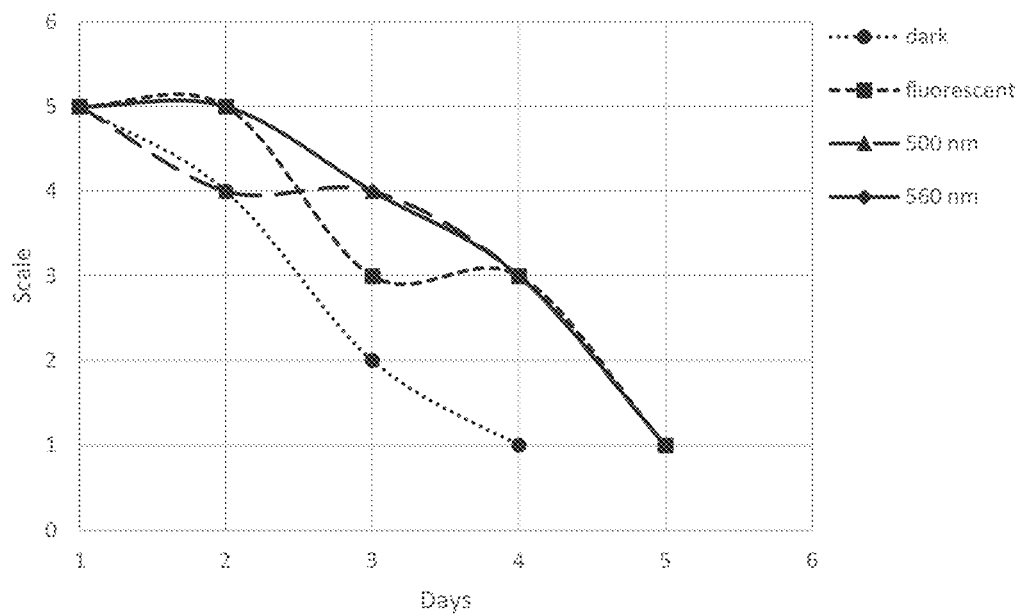
FIG. 5 is a graph showing the results of the visual quality scale for 'Melody' spinach (*Spinacia oleracea* L.), presented over a period of 5 days. The dark treatment is lacking data on day 5 because the quality had deteriorated beyond measurable levels.

For spinach, FIG. 5 shows an average aperture opening of 45 to 57% at 405 to 430 nm, 595 nm, 633 nm, and 661 nm at 50, 100 and 150 µmol m$^{-2}$ s$^{-1}$ irradiance levels. While an average aperture opening of 28% to 33% was observed at 501 nm and 36 to 42% was observed at 500 to 530 nm, respectively. The aperture opening of 560 nm and 575 nm were 26% to 45% for 50, 100 and 150 µmol m$^{-2}$ s$^{-1}$ (FIG. 3).

Figure 4:
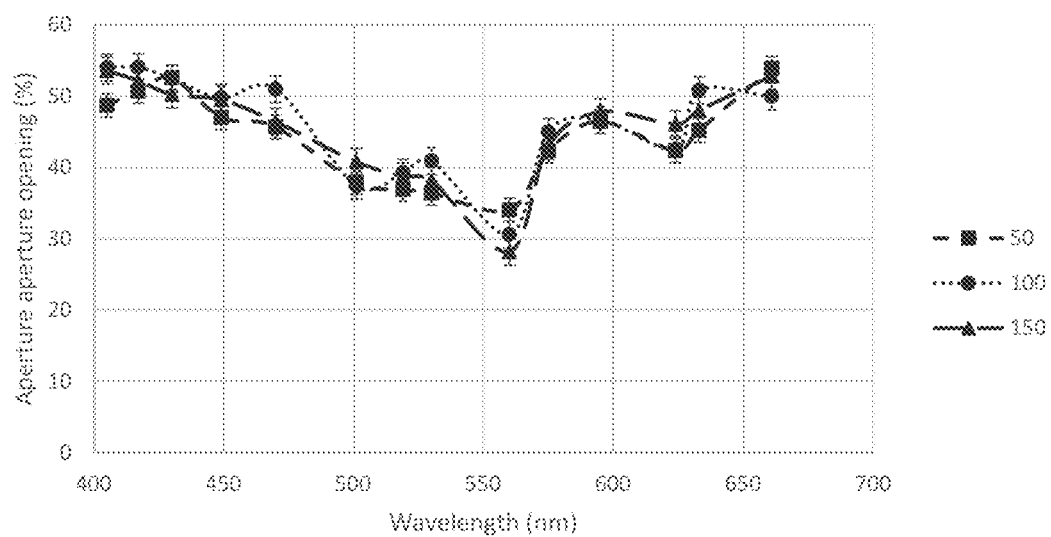
FIG. 4 is a graph showing the average percentage of stomatal aperture opening of 'Winterbor' kale (*Brassica oleracea* L.) seedlings at an irradiance level of 50, 100 and 150 µmol m$^{-2}$ s$^{-1}$ light from 14 LED wavelengths (405, 417, 430, 449, 470, 501, 519, 530, 560, 575, 595, 624, 633, and 661 nm). The data are means of three replicates +/−S.E.

For kale seedlings, the results show a 46 to 57% aperture opening at wavelengths ranging from 405 to 470 nm for all irradiance levels (FIG. 4). In the green light spectrum, the aperture opening ranged from 26 to 37% for all irradiances. In the red-light spectrum, the aperture opening was between 45 and 57% for all irradiances (FIG. 4).

Scheffe's test for multiple comparisons showed difference of wavelength treatments. Wavelengths 501, 519, 530, 560 and 575 nm were statistically different from wavelengths 405, 417, 430, 449 and 470 nm as well as wavelengths 595, 624, 633 and 661 nm. Wavelength 575 nm was not statistically different from 624 nm. Wavelength and irradiance were statistically significant for both spinach and kale. The intensity effect in the model showed a statistical significance (p<0.05) for 50 and 100 µmol m$^{-2}$ s$^{-1}$ as well as 50 and 150 µmol m$^{-2}$ s$^{-1}$ but there was no significant difference between 100 and 150 µmol m$^{-2}$ s$^{-1}$. The irradiance levels did not have a large effect on stomatal aperture opening irrespective of plant type. The interaction effect of wavelength and intensity were statistically significant (p<0.05), the interaction effect of plant species and intensity were not statistically significant. The interaction effect of plant, wavelength and intensity were not statistically significant. The interaction effects that were not statistically significant were removed from the statistical model.

The differences between the aperture opening for spinach and kale in the blue spectrum were at 405 nm at 50 µmol m$^{-2}$ s$^{-1}$. The aperture opening percentage was lower for kale than it was for spinach (FIGS. 3 and 4). The least square means for spinach was slightly higher than that of kale at 44.7 and 44.5, respectively with a standard error of 0.4. The results show that the stomatal opening apertures were slightly lower in kale than spinach which may be due to its capacity to use lower rates of respiration at lower light intensities.

In the green spectrum, the lowest aperture opening percentage occurred at 560 nm for kale at all irradiances (FIG. 4), at 560 nm for 50 and 100 µmol m$^{-2}$ s$^{-1}$ and at 575 nm for 50 µmol m$^{-2}$ s$^{-1}$ for spinach (FIG. 3). For spinach, 519 nm at 50 µmol m$^{-2}$ s$^{-1}$ showed a peak (FIG. 3) but showed a low aperture opening for kale (FIG. 4). These results show a difference in response for spinach and kale although the difference in stomatal opening aperture for spinach and kale was not statistically significant. The nuances in peaks were only limited to a few wavelengths.

Moisture Content and Loss:

Mature detached leaves of spinach lost moisture and visual quality over the course of the 5-day storage. For spinach, the initial fresh mass, final fresh mass and dry mass were 21.6±4.5 g, 12.6±1.6 g and 3.5±1.5 g under the 560 nm treatment, respectively. Under the 500 nm treatment, the results show an initial fresh mass of 21.1±3.3 g and a final fresh mass of 11.5±1.9 g, and a dry mass of 3.9±2.2 g. Under the fluorescent light treatment, the results show an initial fresh mass of 20.9±6.6 g, final fresh mass of 11.5±3.2 g, and final dry mass of 3.8±1.9 g. In the dark (control) treatment, the initial fresh mass, final fresh mass and dry mass were 20.7±4.5 g and 10.1±4.3 g, 3.5±1.7 g, respectively (Table 1). Spinach moisture content showed 83.8±0.1% at 560 nm, 81.5±0.02% at 500 nm, 81.8±0.1% under fluorescent light and 83.1±0.3% for dark (Table 1). The moisture content measurements resulted in losses of 41.7±3.5% under 560 nm treatment, 45.5±0.6% under 500 nm, 45±3.8% under fluorescent treatment, and 51.2±5.6% for the dark treatment (Table 1). Spinach has a short postharvest life caused by an inability to preserve a state of homeostasis after detachment (Pogson and Morris, 2004).

For kale, the effects on shelf life quality assessments differed among treatments. The initial fresh mass, final fresh mass, and dry mass were 42.2±4.2 g, 25.4±1.1 g, and 6.8±4.2 g under the 560 nm treatment, respectively. Under the 500 nm treatment, the results show an initial fresh mass of 38.2±15.4 g, final fresh mass of 20.9±7.8 g, and dry mass of 6.9±3.7 g. Under the fluorescent light treatment, the results were 34.0±8.0 g of initial fresh mass, 16.9±2.8 g of final fresh mass, and 5.7±2.4 g of dry mass, respectively and 32.6±1.7 g, 15.2±4.5 g, and 5.2±2.9 g in the darkness (Table 1). Kale resulted in fresh basis moisture content of 83.9±0.1% at 560 nm, 81.9±0.2% at 500 nm, 83.2±0.2% under fluorescent and 84.0±0.4% in the dark (Table 1). The moisture loss reported under the 560 nm treatment was 39.8±2.9%, while the 500 nm treatment had 45.3±6.0% moisture loss, fluorescent treatment had 50.3±4.9% loss and dark treatment had 53.4±8.3% moisture loss (Table 1). The 560 nm treatment was significant (p>0.05) in comparison with the dark treatment. However, when comparing fluorescent and 500 nm to the dark treatment, the change in moisture was not considered significant (p>0.05).

TABLE 1

The Fresh Mass, Dry Mass and Moisture Content of 'Melody' spinach (*Spinacia oleracea* L.) and 'Winterbor' kale (*Brassica oleracea* L.). Results of initial fresh mass, final fresh mass, dry mass and moisture contents (wet basis) of spinach and kale under four treatments: dark, fluorescent (FL), 500 nm LED, and 560 nm LED.

| | Initial fresh mass (g) | | Final fresh mass (g) | | Dry mass (g) | | Moisture loss (%) | | Moisture content wet basis (%) | |
|---|---|---|---|---|---|---|---|---|---|---|
| | spinach | kale | spinach | kale | spinach | kale | spinach | kale | spinach | kale |
| Dark | 20.7 ± 4.5 | 32.6 ± 1.7 | 10.1 ± 4.3 | 15.2 ± 4.5 | 3.5 ± 1.7 | 5.2 ± 2.9 | 51.2 ± 5.6 | 53.4 ± 8.3 | 83.1 ± 0.3 | 84.0 ± 0.4 |
| FL | 20.9 ± 6.6 | 34 ± 8.0 | 11.5 ± 3.2 | 16.9 ± 2.8 | 3.8 ± 1.9 | 5.7 ± 2.4 | 45.0 ± 3.8 | 50.3 ± 4.9 | 81.8 ± 0.1 | 83.2 ± 0.2 |
| 500 nm | 21.1 ± 3.3 | 38.2 ± 15.4 | 11.5 ± 1.9 | 20.9 ± 7.8 | 3.9 ± 2.2 | 6.9 ± 3.7 | 45.5 ± 0.6 | 45.3 ± 6.0 | 81.5 ± 0.02 | 81.9 ± 0.2 |
| 560 nm | 21.6 ± 4.5 | 42.2 ± 4.2 | 12.6 ± 1.6 | 25.4 ± 1.1 | 3.5 ± 1.5 | 6.8 ± 4.2 | 41.7 ± 3.5 | 39.8 ± 2.9 | 83.8 ± 0.1 | 83.9 ± 0.1 |

Figure 7:
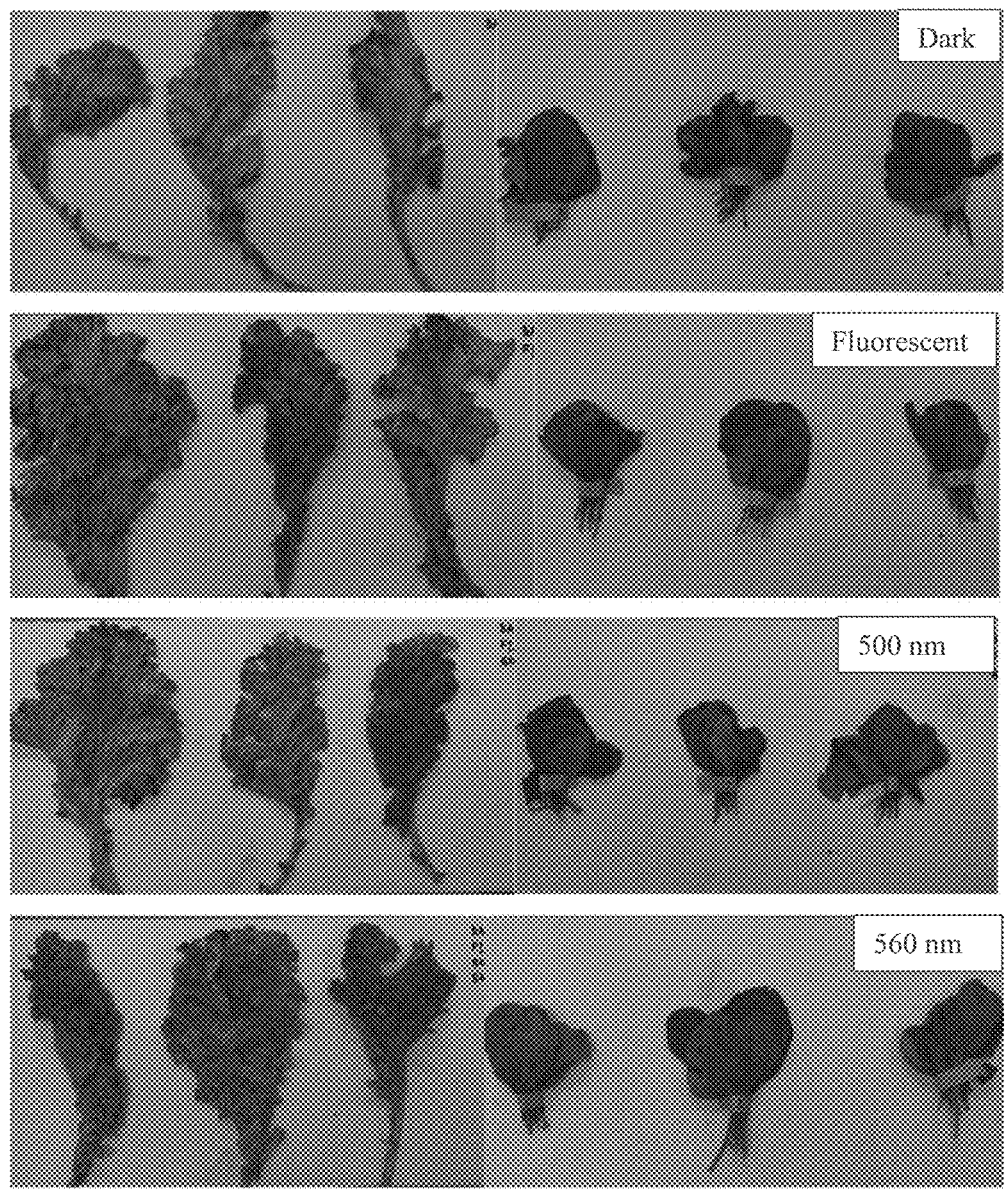
FIG. 7 shows photographs from the shelf life testing of 'Melody' spinach (*Spinacia oleracea* L.) and 'Winterbor' kale (*Brassica oleracea* L.). The results after 4 days of storage: dark, fluorescent, 500 nm and 560 nm.

Visual Assessment:

For the visual assessment of quality of spinach, fluorescent, 500 nm LED and 560 nm LED had similar responses. The visual quality at 560 nm LED and fluorescent lights maintained a score of 5 in the first 2 days, then decreased from day 3 to day 5 (FIG. 5). On day 2, the spinach leaves under the dark treatment had lost an observable amount of moisture and started to wilt. On day 3, the fluorescent, 500 nm and 560 nm light treatments started developing a dark brownish color on the leaves and lost firmness. After 4 days of storage at room temperature, the fluorescent, 500 nm and 560 nm LED light treated spinach were better at preserving its quality than the dark, as the former had slightly firmer leaves (FIG. 7). When stored in the dark, the quality of spinach decreased rapidly and deteriorated by day 2 while plants that had a light treatment maintained quality until day 4. The results show that light helped preserve the quality of leaves better than darkness. However, it is believed that the green light will reduce stomata size more than fluorescent light and results in a lower amount of energy required to reach the light compensation level compared to fluorescent light.

Figure 6:
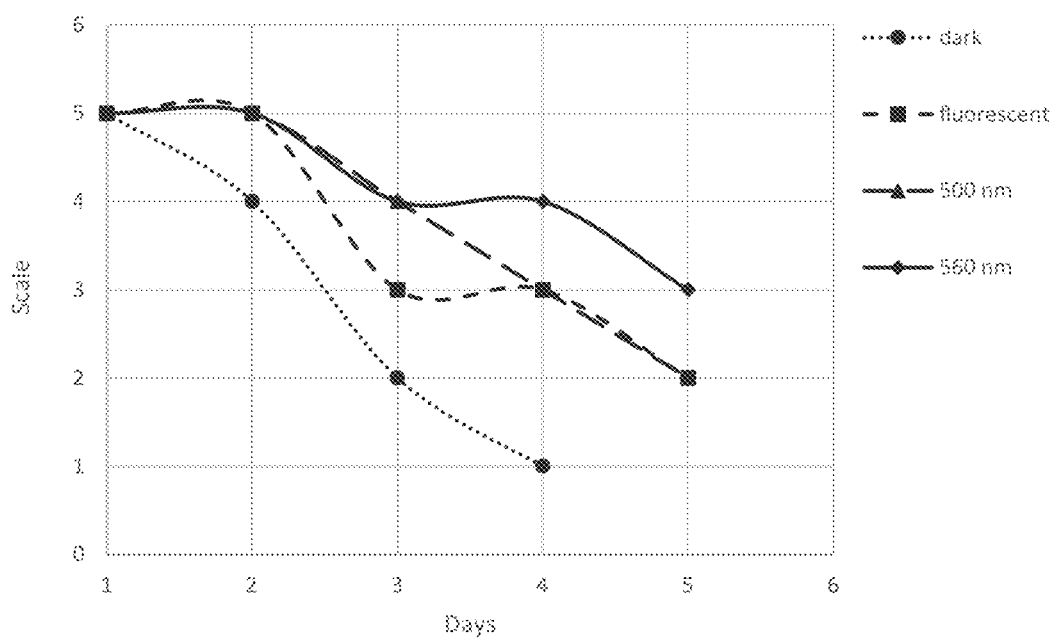
FIG. 6 is a graph showing the results of the visual quality scale for 'Winterbor' kale (*Brassica oleracea* L.), presented for a period of 5 days. The dark treatment is lacking data on day 5 because the quality had deteriorated beyond measurable levels.

The visual assessment which monitored quality throughout the treatment showed a better visual quality score for kale under the 560 nm treatment. The 560 nm light was better at extending the shelf life by 2 days compared to fluorescent and 500 nm light, and by 3 days compared to the dark treatment (control). On day 1, the 500 nm LED, 560 nm LED and fluorescent light treatments maintained a quality score of 5 with the leaves still green and firm. The control plants lost moisture on day 1 and the leaves started yellowing on the edges. On days 2 and 3, the 500 nm LED, 560 nm LED and fluorescent light treatments had a leaf in each treatment starting to yellow on the edges with noticeable loss of moisture. On day 3, the visual quality of 500 nm and fluorescent treatments decreased below 4 (FIG. 6) and showed increased yellowing on the leaves (FIG. 7). Kale under the 560 nm LED light treatment could have been stored for another day or two maintaining its visual quality above a score of 2 (FIG. 6).

All light treatments were significant ($p<0.05$) when compared to the dark treatment. The visual quality of kale under the dark treatment decreased rapidly below marketability (visual assessment of >2) by day 4 which may be due to senescence caused by insufficient photosynthetic activity in the dark. The 560 nm treatment was significant compared to the fluorescent treatment ($p<0.05$). However, the comparison between 500 nm and 560 nm LEDs was considered not significant ($p>0.05$).

The ANOVA significance test showed that the plants, days and treatments were significant, confirming that plant types under different treatments showed responses that varied daily. The Scheffe's multiple comparisons adjustment showed a significant difference for the plant interaction. The results show that kale had better visual quality compared to spinach throughout the 5-day storage which may be due to a lower compensation point and stomatal opening aperture in kale than in spinach.

The interaction between the days of storage were all statistically significant. Room temperature storage resulted in higher moisture loss and faster loss of visual quality.

Conclusion

The light compensation points and stomata aperture size differed with species, light intensity and the wavelength of light. The light compensation points and photosynthetic rate were typically negatively correlated. The wavelengths with high light compensation point resulted in a low photosynthetic rate. The kale light compensation point was lower than that of spinach, which suggests that kale may be stored under lower irradiance levels than spinach and maintain better quality. The photosynthetic response curve correlated with stomata response as did the light compensation point and stomata response.

Green LED wavelengths (500-560 nm) resulted in the plants having lower aperture openings than other wavelengths of light. The wavelengths tested across the green spectrum were similar in stomatal response thus requiring more testing to have a better understanding of the link between stomatal opening, moisture content and their influence on shelf life quality. Treatments of 500 nm and 560 nm LEDs maintained better visual quality and reduced moisture loss. The data obtained in this experiment indicate that LED wavelengths in the green spectrum will extend the shelf life of spinach and kale. It is expected that similar results will be obtained for other HPAH produce. It is expected that similar results will be obtained for other monochromatic light sources other than LEDs. The long-term use of green LEDs to extend the shelf life quality of leafy vegetables can be beneficial for postharvest quality and food security.

Experiment 2

Materials and Methods

Plant Culture:

'Winterbor' kale and 'Melody' spinach were seeded in rockwool cubes (Grodan A/S, Dk-2640, Hedehusene, Denmark) and germinated in a growth chamber (Model E15; Conviron, Winnipeg, Manitoba, Canada) under white fluorescent lights (4200 K, F72T8CW, Osram, USA) at 150 $\mu$mol m$^{-2}$ s$^{-1}$ irradiance, 25 degrees C./25 degrees C., 70% day/night temperature and relative humidity, ambient $CO_2$ and a daily photoperiod of 16 hours. The plants were watered weekly with a full-strength Hoagland nutrient solution (Hoagland and Arnon, 1950).

Stomata Measurements:

Four to six week old kale and spinach plants were used for stomatal aperture size testing. The plants were treated with six different wavelengths of LEDs (ORBITEC, Madison, Wis., USA) across the photosynthetically active radiation (PAR), the wavelengths were: 430 nm, 470 nm, 500 nm, 530 nm, 560 nm, 595 nm, and 633 nm at irradiance levels of 60 and 100 $\mu$mol m$^{-2}$ s$^{-1}$. The measurement of wavelengths and light intensities were determined using a light sensor (Spectroradiometer PS-300, Apogee Instruments, Logan, Utah, USA). Clear nail polish was used to obtain epidermis prints, once dry, clear tape was used to remove the layer and put onto a microscope slide for analysis. For the microscope analysis, an adapter (Microscope Adapter 4 Canon D-SLR w 2X Lens+23.2-30.5 mm, Akishima, Tokyo, JPN) was added to the microscope for stomata pictures. The stomatal aperture size were obtained using image J software (Bethesda, Md., USA) to analyze the pictures and measure the opening and closing size of the stomata under different wavelengths and intensities.

Wavelength Testing, and Conductance Measurements:

Measurements occurred when the 4th true leaf emerged, two weeks after germination for kale and three weeks for spinach. At this stage, the plants were treated with six different wavelengths of LEDs (ORBITEC, Madison, Wis., USA) across the PAR spectrum (400 nm to 700 nm). The wavelengths used are as follows: 430 nm, 470 nm, 500 nm, 530 nm, 560 nm, 595 nm, and 633 nm. Irradiance levels tested were 60 and 100 $\mu$mol m$^{-2}$ s$^{-1}$. The measurement of wavelengths and light intensities were determined using a light sensor (Spectroradiometer PS-300, Apogee Instruments, Logan, Utah, USA). The plants were tested for gas exchange and conductance using the LI-COR *Arabidopsis* chamber (LI-COR, Lincoln, Nebr., USA; LI-6400XT Portable Photosynthesis System). Plants rooted in wet rockwool cubes were wrapped in parafilm for moisture retention. The test plants were placed in the *Arabidopsis* chamber in the dark for 10 minutes for baseline data collection. The LI-6400 controlled the relative humidity (75%+/−3.5%), $CO_2$ concentration (400 ppm+/−10 ppm) and temperature (23 degrees C.+/−1 degree C.). Light treatment with irradiance levels of 60, and 100 $\mu$mol m$^{-2}$ s$^{-1}$ were tested (>30 minutes) while monitoring carbon dioxide levels. Plants were placed in the dark for 10 minutes between the randomly selected wavelengths for dark respiration and to avoid carry over effects from previous measurements. After data collection, leaves were detached to calculate leaf area. A digital image was taken and Image J software (Bethesda, Md., USA) was used to determine leaf area and to calculate leaf-area-normalized photosynthetic rates.

The Statistical Analysis was done using SAS (Cary, N.C., USA) proc GLM and Scheffe's test for multiple comparisons.

Results and Discussion

Figure 8:
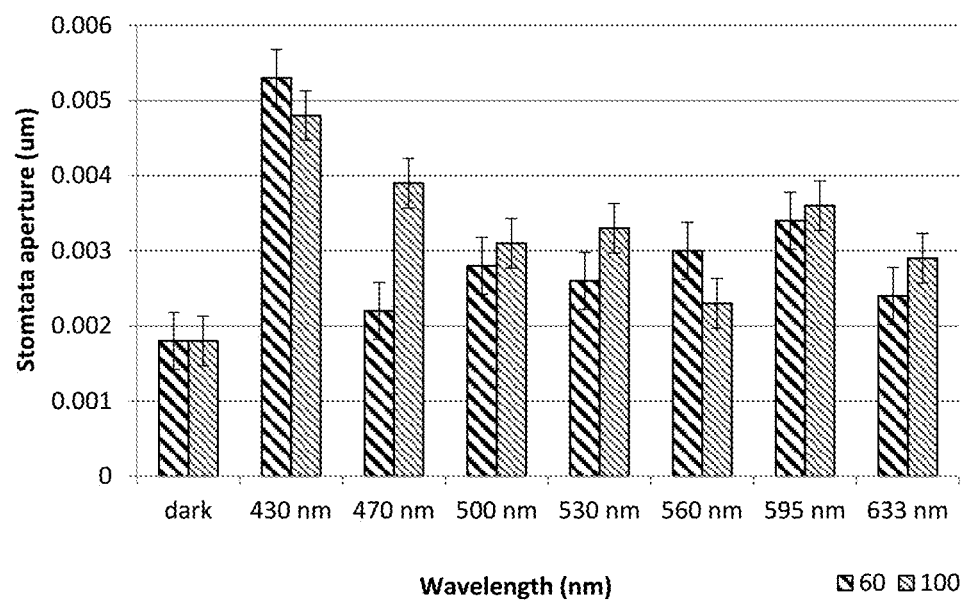
FIG. 8 is a graph showing the stomatal aperture size of 'Winterbor' kale treated with six different wavelengths 430 nm, 470 nm, 530 nm, 560 nm, 595 nm and 633 nm at two irradiance levels 60 and 100 µmol m$^{-2}$ s$^{-1}$ and a dark treatment. The data are means of three replicates ±S.E.

Stomatal Aperture Size:

At 60 µmol m$^{-2}$ s$^{-1}$, the aperture size was highest at 430 nm with a size of 0.0053 µm, 595 nm at 0.0034 µm, 560 nm at 0.003 µm, 500 nm at 0.0028 µm, 530 nm at 0.0026 µm, 633 nm at 0.0024 µm and 470 nm at 0.0022 µm (FIG. 8). At 100 µmol m-2 s-1, 430 nm had an aperture size of 0.0053 µm, 470 nm at 0.0039 µm, 595 nm at 0.0036 µm, 530 nm at 0.0032 µm, 500 nm at 0.0031 µm, 633 nm at 0.0029 µm and 560 nm at 0.0023 µm (FIG. 8). 430 nm was significantly different from the dark treatment, 470 nm, 500 nm, 530 nm, 560 nm, 595 nm and 630 nm. Wavelength and irradiance were statistically significant and the intensity effect showed a statistical significance ($p>0.005$) for 60 and 100 µmol m$^{-2}$ s$^{-1}$.

Figure 9:
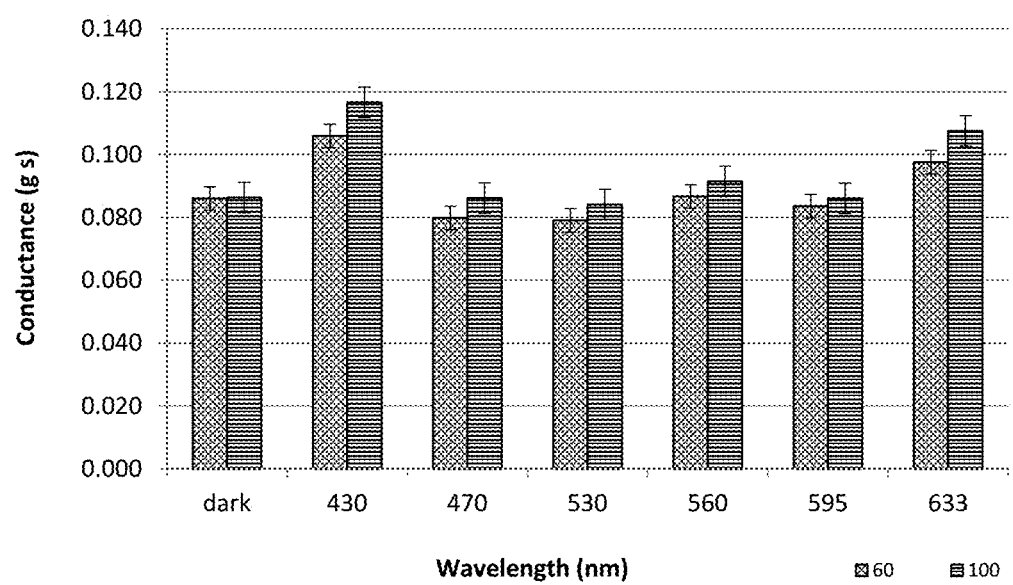
FIG. 9 is a graph showing the conductance of 'Winterbor' kale treated with six different wavelengths 430 nm, 470 nm, 530 nm, 560 nm, 595 nm and 633 nm at two irradiance levels 60 and 100 µmol m$^{-2}$ s$^{-1}$ and a dark treatment. The data are means of three replicates ±S.E.

Conductance:

At 60 µmol m$^{-2}$ s$^{-1}$, the highest conductance was under 430 nm at 0.106, 633 nm at 0.098, 560 nm at 0.087, 595 nm at 0.084, 470 nm at 0.080 and 530 nm at 0.079 (FIG. 9). At 100 µmol m$^{-2}$ s$^{-1}$, 430 nm had a conductance of 0.117, 633 nm at 0.108, 560 nm at 0.091, 595 nm at 0.086, 470 nm at 0.086 and 530 nm at 0.084 (FIG. 9). 430 nm and 633 nm were significantly different from dark, 470 nm, 530 nm, 560 nm, and 595 nm. Wavelength and irradiance were not statistically significant and the intensity effect did not show a statistical significance for 60 and 100 µmol m$^{-2}$ s$^{-1}$.

The stomatal aperture size results show that 470 nm at 60 µmol m$^{-2}$ s$^{-1}$ has a low aperture size that is nearly that of the dark treatment. The data in FIG. 2 show that 470 nm below an irradiance of 60 µmol m$^{-2}$ s$^{-1}$ at light compensation has the ability to keep the stomata closed. A wavelength of 470 nm also has a conductance that is similar to the dark and green light treatments in FIG. 9. Stomata closure can keep the transpiration rate and moisture loss at its lowest point to maintain nutritional value and delay senescence. This can result in shelf life extension.

REFERENCES

Hoagland, D. R., Arnon, D. I. 1950. The water-culture method for growing plants without soil. Circular. California Agricultural Experiment Station 347 (2nd edit).

Kader, A. A., Cantwell, M. 2010. Produce quality rating scales and color charts. Postharvest Horticulture Series 2nd edition.

Pogson, B. J., Morris, S. C. 2004. Postharvest senescence of vegetables and its regulation. In: Nood+en L D, editor. Plant cell death processes. San Diego: Academic Press. p 319-329.

We claim:

1. A method for storing harvested photosynthetic active horticultural produce, comprising:
   a. between harvesting and consumption of the harvested photosynthetic active horticultural produce, exposing the harvested photosynthetic active horticultural produce to only green light;
   wherein the green light is emitted from a monochromatic LED and has a peak wavelength of between about 500 nm and about 580 nm, inclusive; and
   wherein the green light is emitted at approximately the light compensation point for the harvested photosynthetic active horticultural produce at the peak wavelength.

2. The method of claim 1, wherein the green light has a peak wavelength of about 500 nm or of about 560 nm.

3. The method of claim 1, wherein step a. comprises exposing the harvested photosynthetic active horticultural produce to only the green light for a daily photoperiod.

4. The method of claim 1, wherein between harvesting and consumption, the harvested photosynthetic active horticultural produce is exposed to only the green light for an integrated photoperiod of between 8 and 16 hours daily.

5. The method of claim 1, wherein the harvested photosynthetic active horticultural produce comprises leafy greens, a fruit, a vegetable, and/or a flower.

6. The method of claim 1, further comprising refrigerating the harvested photosynthetic active horticultural produce during the exposure to only the green light.

7. The method of claim 1, further comprising sensing a light parameter around the harvested photosynthetic active horticultural produce, and adjusting at least one of an irradiance and a wavelength of the green light based on the sensed light parameter.

8. The method of claim 1, wherein step a. comprises:
   i. placing the harvested photosynthetic active horticultural produce in a casing; and
   ii. activating a green light emitting LED within the casing.

* * * * *